United States Patent
Shoji

(10) Patent No.: US 8,487,596 B2
(45) Date of Patent: Jul. 16, 2013

(54) DRIVING CIRCUITRY AND AN INTEGRATED CIRCUIT FOR USE THEREIN

(75) Inventor: Michiharu Shoji, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 748 days.

(21) Appl. No.: 12/470,395

(22) Filed: May 21, 2009

(65) Prior Publication Data

US 2009/0289613 A1    Nov. 26, 2009

(30) Foreign Application Priority Data

May 22, 2008    (JP) .................................. 2008-134320

(51) Int. Cl.
*G05F 1/00*    (2006.01)

(52) U.S. Cl.
USPC ........................................................ 323/282

(58) Field of Classification Search
USPC ................. 323/282, 299, 269–275, 284–286, 323/288; 363/21.12–21.18
See application file for complete search history.

(56) References Cited

U.S. PATENT DOCUMENTS

| 4,730,122 A * | 3/1988 | Dreibelbis et al. .............. 307/75 |
| 5,945,820 A * | 8/1999 | Namgoong et al. .......... 323/282 |
| 7,795,848 B2 * | 9/2010 | Aiura et al. ................... 323/269 |
| 2005/0269980 A1 | 12/2005 | Hongo |

FOREIGN PATENT DOCUMENTS

| JP | 2001-025238 A | 1/2001 |
| JP | 2005-323413 A | 11/2005 |
| JP | 2006-020495 | 1/2006 |
| JP | 2007-020338 A | 1/2007 |
| KR | 10-2005-0090824 A | 9/2005 |

* cited by examiner

*Primary Examiner* — Adolf Berhane
*Assistant Examiner* — Yemane Mehari
(74) *Attorney, Agent, or Firm* — Canon U.S.A., Inc. IP Division

(57) ABSTRACT

Driving circuitry having driving means for driving a load using a first DC voltage, regulator means for receiving an input voltage and deriving a regulated output voltage from the input voltage, and power source switch means switchable between a first state in which the first DC voltage is supplied to the regulator means as the input voltage and a second state in which a second DC voltage, lower than the first DC voltage and higher than the regulated output voltage, is supplied to the regulator means as the input voltage, second voltage deriving means for deriving the second DC voltage from the first DC voltage, and switch control means connected to the power source switch means for causing the power source switch means to switch from the first state to the second state when the second DC voltage is suitable for supply to the regulator means as the input voltage.

19 Claims, 4 Drawing Sheets

DRIVING CIRCUITRY AND AN INTEGRATED CIRCUIT FOR USE THEREIN

BACKGROUND OF THE INVENTION

1. Field of the Invention

The present invention relates to driving circuitry and to an integrated circuit usable in such driving circuitry and its control.

2. Description of the Related Art

An electronic apparatus such as an inkjet recording apparatus includes a plurality of motors, for example, a scanning motor for a recording head and a conveying motor for a recording paper. Some motor driving circuits for driving a plurality of motors are formed as one integrated circuit (IC). Further, there is a direct current/direct current (DC/DC) converter for supplying electric power to a motor, a recording head, a control circuit or the like. Japanese Patent Application Laid-Open No. 2006-20495 discusses one integrated circuit in which a DC/DC converter circuit and a motor driving circuit are integrated.

A DC/DC converter circuit provided on an integrated circuit converts an input voltage to a lower output voltage. In some central processing units (CPUs) and application-specific integrated circuits (ASICs) in recent years, a driving voltage is reduced. Thus, a voltage to be output to a low voltage circuit is also reduced. Under such circumstances, a difference between an input voltage and an output voltage is increased. Accordingly, in a DC/DC converter circuit, the amount of heat generated due to conversion loss of a voltage is increased. The heating amount in an integrated circuit including a motor driving circuit causes malfunction of a driving circuit. Further, a control unit of an electronic apparatus uses electric power generated in an integrated circuit. Thus, heat generated in an integrated circuit causes operation of a DC/DC converter circuit to stop and as a result, operation of an electronic apparatus is discontinued.

SUMMARY OF THE INVENTION

The present invention is directed to driving circuitry, an integrated circuit, and an electronic apparatus. According to an aspect of the present invention, driving circuitry has driving means for driving a load using a first DC voltage, regulator means for receiving an input voltage and for deriving a regulated output voltage from the input voltage, and power source switch means switchable between a first state in which the first DC voltage is supplied to the regulator means as the input voltage and a second state in which a second DC voltage (Vb), lower than the first DC voltage and higher than the regulated output voltage, is supplied to the regulator means as the input voltage. The driving circuitry also has second voltage deriving means for deriving the second DC voltage from the first DC voltage, and switch control means connected to the power source switch means for causing the power source switch means to switch from the first state to the second state when the second DC voltage is suitable for supply to the regulator means as the input voltage.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

Figure 1:
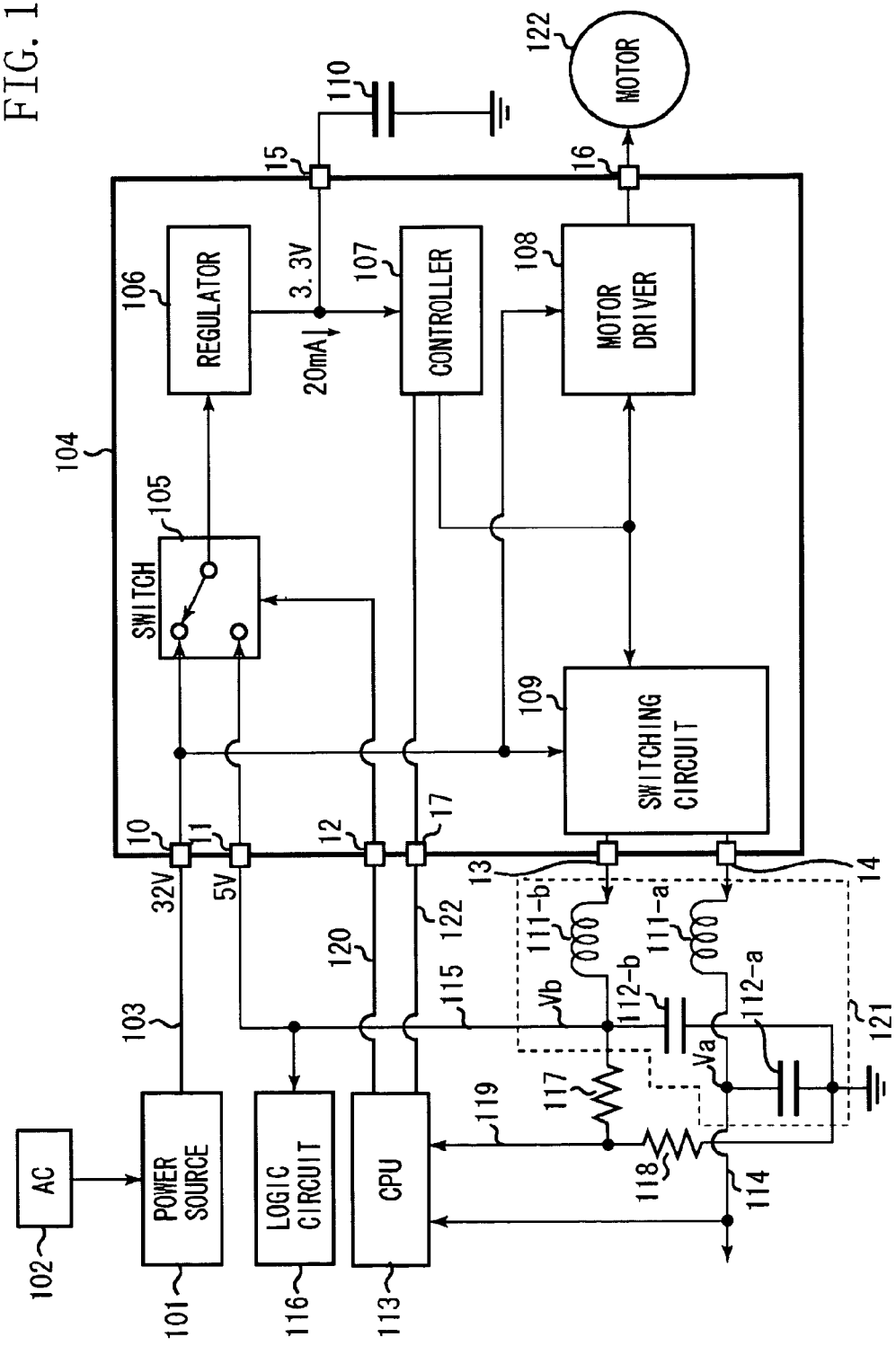
FIG. 1 is a block diagram illustrating an electronic apparatus according to a first exemplary embodiment of the present invention.

FIG. 1 is a block diagram illustrating an electronic apparatus according to a first exemplary embodiment of the present invention. The electronic apparatus is a recording apparatus which applies signals (scan signals) to a recording head to execute recording on a recoding medium. An integrated circuit 104 includes a driving circuit for driving a load (for example, motor).

A power source 101 is an alternating current/direct current (AC/DC) power source. The power source 101 receives input from an AC power source 102, thereby outputting a DC voltage 103. A voltage (for example, 32 volts (V)) 103 for use in motor driving or the like is output from the power source 101 and input via an input unit (first input unit) 10 of the integrated circuit 104. The integrated circuit 104 includes an input unit (second input unit) 11 configured to input a voltage (5 volts) from a smoothing circuit 121 which will be described later. The integrated circuit 104 communicates with a CPU 113 using a signal line 122. The CPU 113 controls operation of a recording apparatus.

The integrated circuit 104 includes a regulator 106, a controller 107, a motor driver 108, and a switching circuit 109. The integrated circuit 104 further includes a switch 105. The regulator (voltage conversion circuit) 106 decreases an input voltage to a predetermined voltage. The switch 105 selects an electric power source supplied to the regulator 106. With the switch 105, it is determined whether electric power is supplied from the input unit 10 or the input unit 11. For example, when the integrated circuit 104 is started, electric power input from the input unit 10 is supplied to the regulator 106. Then, once a predetermined condition is met, electric power input from the input unit 11 is supplied to the regulator 106.

The controller 107 operates at a voltage of 3.3 volts generated by the regulator 106. The controller 107 controls the motor driver 108 and the switching circuit 109. The controller 107 controls the motor driver 108 and the switching circuit 109 based on commands and data input from an input and output unit 17. Further, the controller 107 outputs information concerning a state of an integrated circuit or the like from the input and output unit 17 to a CPU. A capacitor 110 is connected to an output of the regulator 106 via an external terminal for the purpose of stabilizing a voltage.

The switching circuit 109 executes output of two systems. The switching circuit 109 has two outputs 13 and 14. A switching element (for example, field effect transistor (FET)) within the switching circuit 109 is associated with each of these outputs. The IC controller 107 includes two control circuits, each of which controls one of the switching elements in the switching circuit 109. The switching circuit 109 cooperates with the smoothing circuit 121 to generate two different power supply voltages (voltage pulse signals) Va and Vb. One of these power supply voltages Va is used to power the CPU 113 and other components (not shown) connected to a power supply line 114. The CPU 113 and other components connected to the power supply line 114 can be considered to be a first system. The other of these power supply voltages Vb is used to power logic circuits 116 connected to another power supply line 115 and as the reduced power source voltage for the regulator 106 when the switch 105 is switched over by the CPU. The logic circuits 116 and other elements connected to the power supply line 115 can be considered a second system.

The smoothing circuit 121, including inductors (111-a, 111-b) and capacitors (112-a, 112-b), smoothes an output voltage of each output 13 and 14 to convert the voltage into a DC voltage of a desired voltage value. For example, a voltage (Va) of the power source line 114 is 1.6 volts and is supplied to the CPU 113. Further, for example, a voltage (Vb) of the power source line 115 is 5 volts and is supplied to a logic circuit 116. When, for example, an electronic apparatus is a recording apparatus, a voltage from the logic circuit 116 is supplied to an operational amplifier provided on a recording head. Further, a voltage of the power source line 115 is supplied to the switch 105 provided in the integrated circuit 104 via the input unit 11.

A voltage divided by resistances 117 and 118 is input as a monitoring signal to a port of the CPU 113 via a power source line 119. After the CPU 113 is activated, the CPU 113 determines whether output 115 is normal (suitable for use as a power source for the regulator 106) based on a voltage level input to the port. In this embodiment the CPU 113 determines that the output 115 is normal or suitable when the input voltage level at the port connected to line 119 reaches a predetermined level but in other embodiments the determination could be based on stability of the output 115 or some other relevant criteria. Also, in this embodiment the suitability of the output 115 is judged by the CPU 113 indirectly, based on the monitoring signal on line 119, which is possible because the output 119 is dependent on the output 115 as a result of the voltage divider formed by the resistances 117 and 118. However, in other embodiments the suitability could be judged based on the output 115 directly. When the CPU 113 determines that the output 115 is normal, the CPU 113 outputs a control signal 120 for switching to the switch 105. The integrated circuit 104 includes an input unit 12 configured to input the control signal 120. Thus, the switch 105 switches an electric power supply line to the regulator 106 from the DC voltage 103 to the power source line 115.

The switch 105 can change an input voltage into the regulator 106 from 32 volts to 5 volts. Subsequently, the regulator 106 decreases a voltage of 5 volts. Control of a motor 122 is executed according to a command from the CPU 113.

In another exemplary embodiment, the CPU 113 may confirm a state of a voltage of the power source line 115 by confirming normal activation of the switching element 109. Thus, the resistances 117 and 118 become unnecessary, and a port do not need to be allocated to the CPU 113. Thus, a reduction in resistance element and allocation of a port to other applications can be achieved.

Figure 2:
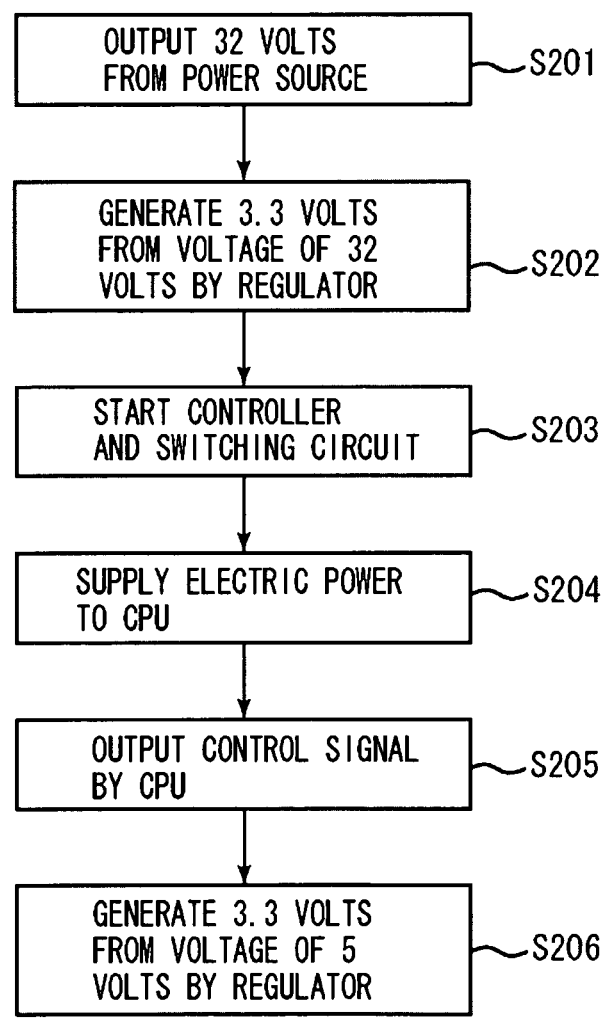
FIG. 2 is a flowchart illustrating operation of an electronic apparatus according to the first exemplary embodiment.

FIG. 2 is a flowchart illustrating operation of an electronic apparatus according to the first exemplary embodiment. In step S201, the power source 101 outputs a direct current voltage of 32 volts. In step S202, the regulator 106 generates a voltage of 3.3 volts. In step S203, the controller 107 and the switching circuit 109 start operating. When the switching circuit 109 starts operation, a voltage is generated in the smoothing circuit 121. In step S204, the CPU 113 receives the power supply voltage Va from the smoothing circuit 121 and is activated. After the CPU 113 is activated, the CPU 113 compares output 119 of the smoothing circuit 121 and a threshold voltage, thereby confirming that the switching circuit 109 and the smoothing circuit 121 are operating normally. After confirmation of the operation, in step S205, the CPU 113 outputs the control signal 120 to the integrated circuit 104. In step S206, when the control signal 120 is input, the switch 105 is operated and the regulator 106 generates a voltage of 3.3 volts from a voltage of 5 volts. Subsequently, the regulator 106 continues to generate a voltage of 3.3 volts from a voltage of 5 volts.

In the example described above, a relation between electric power and heat generation is as follows. Output of the power source 103 is 32 V (volts), a voltage generated in the smoothing circuit 121 and input to the integrated circuit 104 is 5 V (volts), and a voltage generated by the regulator is 3.3 V (volts). A heat resistance is 25° C./W with an integrated circuit mounted on a substrate and a logic current consumed when an integrated circuit is operated is 20 mA. Under the above-described conditions, a difference in loss caused by switching an input voltage from 32 V (volts) to 5 V (volts) is calculated as follows:

$$(32\ V - 3.3\ V) \times 20\ mA - (5\ V - 3.3\ V) \times 20\ mA = 0.54\ W \qquad (1)$$

$$0.54\ W \times 25°\ C./W = 13.5°\ C. \qquad (2)$$

Under the above-described conditions, a reduction of about 13.5° C. in temperature of an integrated circuit can be realized.

Figure 3:
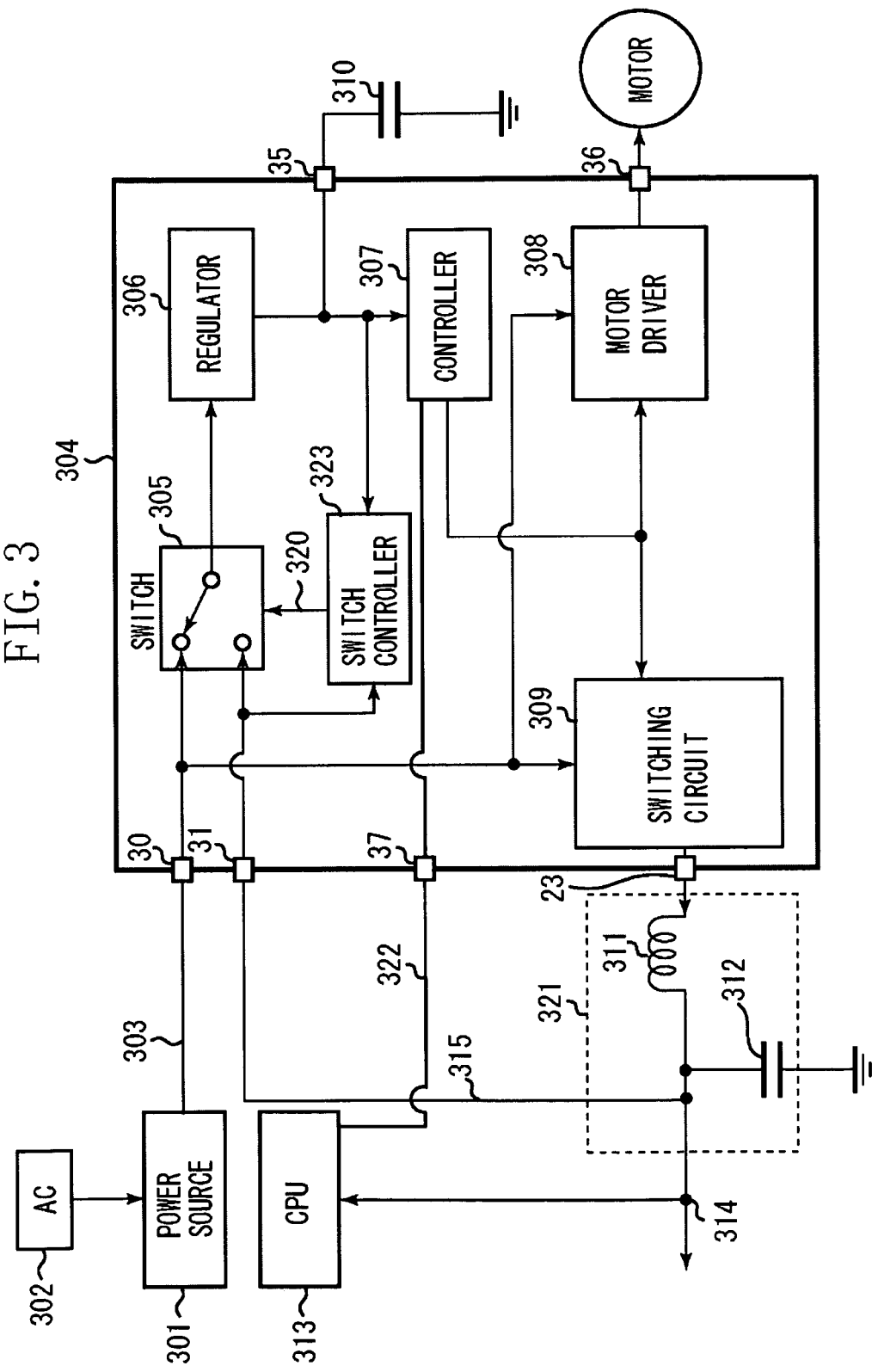
FIG. 3 is a block diagram illustrating an electronic apparatus according to a second exemplary embodiment.

FIG. 3 is a block diagram illustrating an electronic apparatus according to a second exemplary embodiment of the present invention. Only points different from the first exemplary embodiment will be described. In the second exemplary embodiment, with respect to points similar to the first exemplary embodiments, descriptions will be omitted. In the first exemplary embodiment, the operation of a switch 305 has been executed based on a signal from the CPU 113 outside an integrated circuit. However, in the second exemplary embodiment, the operation of the switch 305 is executed by a switch controller 323. The switch controller 323 receives the power supply it needs for its operation from a regulator 306.

In a switching circuit 309, a DC voltage 303 is subjected to pulse control by a switching element and is output. This pulse is smoothed by a smoothing circuit including an inductor 311 and a capacitor 312, and is converted into a DC voltage. This DC voltage is supplied to a CPU 313 via a power source line 314. Further, this DC voltage is input from an input unit 31 to the switch 305 and the switch controller 323 in the integrated circuit 104.

Figure 4:
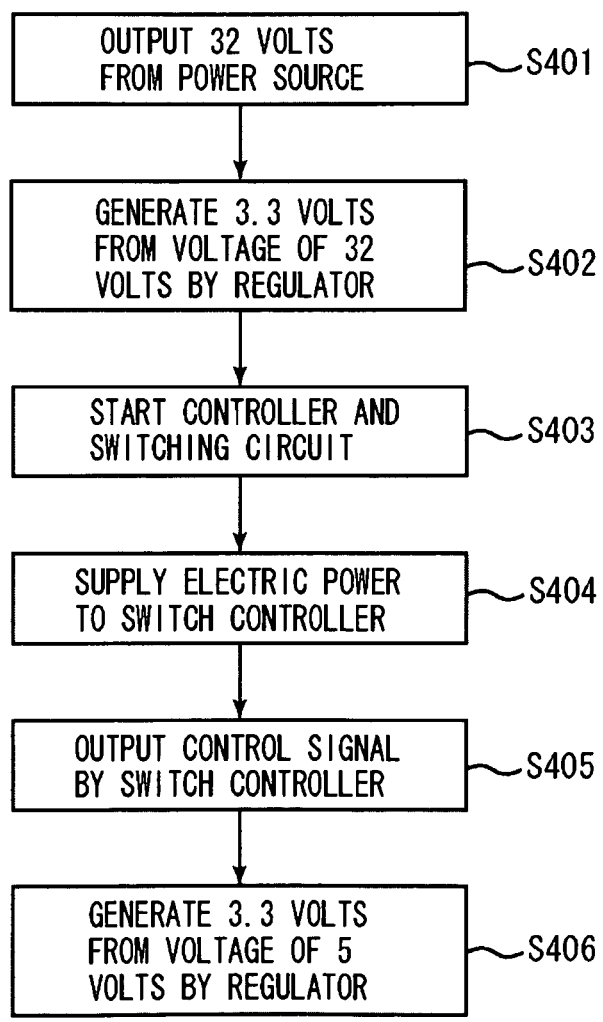
FIG. 4 is a control flowchart illustrating operation of an electronic apparatus according to the second exemplary embodiment.

FIG. 4 is a flowchart illustrating operation of an electronic apparatus according to the second exemplary embodiment. Since processing from step S401 to step S403 is similar to that in FIG. 2 described in the first exemplary embodiment, their descriptions will be omitted.

In step S404, the switch controller 323 is activated by receiving power supply from the smoothing circuit 321. In step S405, the switch controller 323 outputs a control signal 320. In step S406, the switch is operated by the control signal 320 and the regulator 306 generates a voltage of 3.3 volts from a voltage of 5 volts.

Note that in the above-described exemplary embodiment, a driving circuit provided in an integrated circuit is not limited to that used for a motor. For example, a driving circuit for driving a recording head, a charge coupled device (CCD), a light emitting diode (LED) or the like as a load may be employed.

In the above-described second exemplary embodiment, the switch controller 323 may be configured to check a voltage input from the input unit 31 using an upper limit voltage value, a lower limit voltage value, or both. When an input voltage is in an abnormal condition, the switch controller 323 may inform the CPU 313 of the abnormal condition.

Further, in order to determine in advance whether the input unit 31 of an integrated circuit is connected to a ground, in step S404, the switch controller 323 may execute processing whether an electrical potential of the input unit 31 is 0 V.

Further, in an exemplary embodiment, an integrated circuit includes one motor driver circuit. However, an integrated circuit may include a plurality of motor driver circuits.

An embodiment of the present invention can provide an integrated circuit 104 including a driving circuit for driving a load with a DC voltage generated by a power source circuit and a voltage conversion circuit 106 for decreasing the DC voltage, the integrated circuit 104 comprising: a switching circuit 109 for generating a voltage pulse using the DC voltage; an output unit configured to output the voltage pulse generated by the switching circuit 109 to a smoothing circuit provided outside the integrated circuit 104; a first input unit configured to receive a first DC voltage generated by the power source circuit; a second input unit configured to receive a second DC voltage which is generated by the smoothing circuit and is lower than the first DC voltage; and a control circuit 107 configured to operate based on a voltage decreased by the voltage conversion circuit 106, and control the switching circuit 109 and the driving circuit.

The integrated circuit 104 may further comprise: a switch circuit configured to perform switching to supply a voltage input from the first input unit to the voltage conversion circuit 106 and supply a voltage input from the second input unit to the voltage conversion circuit 106 after the second DC voltage reaches a predetermined voltage value.

In one embodiment the switch circuit executes the switching based on a signal output from a second control circuit 107 that is operated based on electric power supplied from the smoothing circuit.

In one embodiment the load is a motor.

In one embodiment the integrated circuit 104 is a semiconductor circuit of one chip.

Another embodiment of the present invention can provide an electronic apparatus comprising: an integrated circuit 104 as described above. The electronic apparatus may be a recording apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-134320 filed May 22, 2008, which is hereby incorporated by reference herein in its entirety.

What is claimed is:

1. Driving circuitry comprising:
   driving means for driving a load using a first DC voltage;
   regulator means for receiving an input voltage and for deriving a regulated output voltage from the input voltage;
   power source switch means switchable between a first state in which the first DC voltage is supplied to the regulator means as input voltage of the regulator means and a second state in which a second DC voltage, lower than the first DC voltage and higher than the regulated output voltage, is supplied to the regulator means as the input voltage of the regulator means;
   second voltage deriving means for deriving the second DC voltage from the first DC voltage; and
   switch control means connected to the power source switch means for causing the power source switch means to switch from the first state to the second state when the second DC voltage is suitable for supply to the regulator means as the input voltage of the regulator means.

2. Driving circuitry according to claim 1, wherein the second voltage deriving means comprises a switching circuit adapted to generate one or more pulse outputs using the first DC voltage and a smoothing circuit connected to the switching circuit for smoothing the one or more pulse outputs to generate at least the second DC voltage.

3. Driving circuitry according to claim 2, wherein the power source switch means and the switching circuit of the second voltage deriving means form a part of the same integrated circuit, and the smoothing circuit is outside the integrated circuit.

4. Driving circuitry according to claim 3, wherein at least a part of the switch control means is outside the integrated circuit.

5. Driving circuitry according to claim 4, wherein at least a part of the switch control means is powered by one or more voltages generated by the cooperation of the switching circuit and the smoothing circuit.

6. Driving circuitry according to claim 1, wherein the switch control means is operable to employ a monitoring signal dependent on the second DC voltage to determine whether the second DC voltage is suitable for supply to the regulator means.

7. Driving circuitry according to claim 1, further comprising driving control means for controlling the driving means, the driving control means being powered from the regulated output voltage.

8. An electronic apparatus comprising:
   the driving circuitry according to claim 1.

9. Driving circuitry according to claim 1, further comprising voltage generating means for generating the first DC voltage.

10. Driving circuitry according to claim 1, further comprising driving control means for controlling the switching circuit.

11. An integrated circuit comprising:
    driving means for driving a load using a first DC voltage;
    regulator means for receiving an input voltage and for deriving a regulated output voltage from the input voltage;
    power source switch means switchable between a first state in which the first DC voltage is supplied to the regulator means as input voltage of the regulator means and a second state in which a second DC voltage, lower than the first DC voltage and higher than the regulated output voltage, is supplied to the regulator means as the input voltage of the regulator means; and
    switching means for cooperating with smoothing means provided outside the integrated circuit to derive the second DC voltage from the first DC voltage wherein the power source switch means is switched from the first state to the second state when the second DC voltage is suitable for supply to the regulator means as the input voltage of the regulator means.

12. The integrated circuit according to claim 11, further comprising:

a first input unit configured to receive the first DC voltage from a power source circuit provided outside the integrated circuit;

a second input unit configured to receive the second DC voltage from the smoothing circuit; and control means, powered from the regulated output voltage, and operable to control the switching circuit and the driving circuit.

13. The integrated circuit according to claim 11, wherein the switching circuit is adapted to generate one or more pulse outputs using the first DC voltage, the one or more pulse outputs being employed by the smoothing circuit to generate at least the second DC voltage.

14. The integrated circuit according to claim 11, wherein the power source switch means is switched from the first state to the second state after the second DC voltage reaches a predetermined voltage value.

15. The integrated circuit according to claim 11, further comprising a switch control input for receiving a control signal output from control circuitry provided outside the integrated circuit.

16. An electronic apparatus comprising:
the integrated circuit according to claim 11; and
switch control means for causing the power source switch means to switch from the first state to the second state when the second DC voltage is suitable for supply to the regulator means as the input voltage of the regulator means.

17. A driving unit comprising:
electric power supply means for generating a driving voltage;
driving means for receiving the driving voltage and driving a load;
switching means for receiving the driving voltage and generating a voltage pulse;
smoothing means for receiving the voltage pulse generated by the switching means and generating a first logic voltage lower than the driving voltage;
voltage conversion means for converting the driving voltage input from the electric power supply means and a voltage input from the smoothing means into a second logic voltage lower than the first logic voltage;
control means for receiving the second logic voltage and controlling the driving means and the switching means; and
switching means for switching from a state in which the voltage conversion means is connected to the electric power supply means so as to be supplied with the driving voltage generated by the electric power supply means until the voltage generated by the smoothing means reaches a predetermined voltage value to a state in which the voltage conversion means is connected to the smoothing means after the voltage generated by the smoothing means reaches the predetermined voltage value.

18. The driving unit according to claim 17, wherein the switching means includes second control means for controlling the control means.

19. An electronic apparatus comprising:
the driving unit according to claim 17; and
a motor as the load.

* * * * *